(12) United States Patent
Wentink

(10) Patent No.: US 7,468,976 B2
(45) Date of Patent: Dec. 23, 2008

(54) EFFICIENCY IMPROVEMENT FOR SHARED COMMUNICATIONS NETWORKS

(75) Inventor: Maarten Menzo Wentink, Utrecht (NL)

(73) Assignee: Xocyst Transfer AG L.L.C., Wilmington, DE (US)

( * ) Notice: Subject to any disclaimer, the term of this patent is extended or adjusted under 35 U.S.C. 154(b) by 1101 days.

(21) Appl. No.: 10/273,799

(22) Filed: Oct. 18, 2002

(65) Prior Publication Data

US 2003/0235197 A1 Dec. 25, 2003

Related U.S. Application Data

(60) Provisional application No. 60/391,400, filed on Jun. 25, 2002.

(51) Int. Cl.
*H04L 12/28* (2006.01)
*H04J 3/24* (2006.01)

(52) U.S. Cl. .................. 370/389; 370/473; 370/474

(58) Field of Classification Search .............. 370/328, 370/389, 473, 474
See application file for complete search history.

(56) References Cited

U.S. PATENT DOCUMENTS

| | | | | |
|---|---|---|---|---|
| 6,377,782 B1 * | 4/2002 | Bishop et al. | ............. | 455/3.01 |
| 7,130,303 B2 * | 10/2006 | Hadzic | ............. | 370/389 |
| 2002/0080810 A1 * | 6/2002 | Casais | ............. | 370/428 |
| 2002/0114301 A1 * | 8/2002 | Yee et al. | ............. | 370/338 |
| 2004/0146067 A1 * | 7/2004 | Yi et al. | ............. | 370/474 |
| 2006/0078001 A1 * | 4/2006 | Chandra et al. | ............. | 370/473 |
| 2006/0268878 A1 * | 11/2006 | Jung et al. | ............. | 370/392 |
| 2007/0133605 A1 * | 6/2007 | Herrmann | ............. | 370/473 |

* cited by examiner

*Primary Examiner*—Firmin Backer
*Assistant Examiner*—Nittaya Juntima
(74) *Attorney, Agent, or Firm*—McDonnell Boehnen Hulbert & Berghoff LLP

(57) ABSTRACT

A technique for providing data unit concatenation in a shared communications network is disclosed. The technique establishes a distinction between a first address space and a second address space within one or more shared communications networks, such as a wireless local area network, in a telecommunications system. At a transmitter node, data units arriving from one or more source nodes are packaged together if they are intended a network accessible through a receiver and then are transmitted to the receiver node. During the transfer of data units across the telecommunications system, the addressing mechanism will use either source and destination nodes or transmitter and receiver nodes, depending on the address space relevant at the moment of transmission. The technique increases utilization efficiency, because overhead attributed to headers, acknowledgements and interframe gaps is reduced.

21 Claims, 6 Drawing Sheets

EFFICIENCY IMPROVEMENT FOR SHARED COMMUNICATIONS NETWORKS

CROSS-REFERENCE TO RELATED APPLICATIONS

This application claims the benefit of U.S. Provisional Patent Application Ser. No. 60/391,400, entitled "MSDU Concatenation For Wireless LANs," filed on Jun. 25, 2002 and incorporated by reference.

FIELD OF THE INVENTION

The present invention relates to telecommunications in general, and, more particularly, to improving bandwidth efficiency on shared communications networks (e.g., wireless local area networks, etc.).

BACKGROUND OF THE INVENTION

The physical layer data rates (i.e., raw bit rates) of many types of shared communications networks have, in general, increased over time. At the same time, regarding the utilization efficiency of the same shared communications networks, there continues to be room for improvement. The overhead attributed to medium access control protocol is a limiting factor in achieving higher efficiency in shared communications networks. The inherent protocol overhead consists of headers, interframe spaces, backoff slots and acknowledgements as is known in the art. This abundance of overhead limits effective capacity of user data (as opposed to physical layer data) and can contribute to transfer latency. One example of a shared communications network replete with and acutely affected by overhead is a wireless local area network.

In particular, the problem of inefficiency is often greater on some links than on others and can affect an important subset of nodes in a shared communications network. Such is the case in the prior art, as shown in the example of telecommunications system 100 in FIG. 1, where a first set of nodes implemented by terminals 111-1 through 111-5 constitutes first shared communications network 101, where a second set of nodes implemented by terminals 112-1 through 112-5 constitutes second shared communications network 102, and where some nodes (i.e., implemented by terminals 111-3 and 112-1) from each of the two sets of nodes constitute third shared communications network 103. In this example, if a node from network 101 (i.e., a first end node) has to transfer something to a node in network 102 (i.e., a second end node), nodes with access to network 103 (i.e., intermediate nodes) have to participate in the transfer. If the intermediate nodes in network 103 also participate in transfers between other end nodes, the transfers through the intermediate nodes create an area of traffic congestion comprising the intermediate nodes. Furthermore, the latency grows with increased congestion, requiring longer transfer times between the end nodes.

Therefore, the need exists for a technique for improving the utilization efficiency of a shared communications network overall, improving user data capacity and decreasing latency throughout the system.

SUMMARY OF THE INVENTION

Illustrative embodiments of the present invention teach a new method of data unit concatenation that provides a solution to the capacity and latency problems described above. The usefulness of the illustrative embodiments of the present invention is further increased as the maximum data unit and data frame sizes are made larger, such as what might be implemented in future physical layers in shared communications networks.

Without concatenation, the medium access control receives a data unit from the higher layer and changes it into a data frame by adding the appropriate medium access control header. With the inventive concatenation method disclosed, the medium access control at a transmitter node receives multiple data units, possibly from different source nodes, concatenates them into a single payload, and turns that payload into a data frame by adding the appropriate medium access control header. The data frame is transmitted by the transmitter node and is received by a receiver node, which separates out multiple data units, possibly intended for different destination nodes. The key to the technique described in the illustrative embodiment is differentiating between a first address space, comprising addresses for the transmitter and receiver nodes, and a second address space, comprising addresses for the source and destination nodes. In particular, the technique disclosed has applications in wireless local area networks, such as 802.11-based networks.

The illustrative embodiment of the present invention comprises: concatenating data units at a transmitter node in a wireless local area network, the method comprising forming a data frame addressed for a receiver node, in which the data frame comprises a header field and a payload field, and in which the payload field comprises a first header subfield and a first payload data subfield; populating the first payload data subfield with at least one data unit; populating the header field with a receiver address uniquely associated with the receiver node and a transmitter address uniquely associated with the transmitter node; and populating the first header subfield with a first source address and a first destination address that are associated with the first payload data subfield.

DETAILED DESCRIPTION

Figure 1:
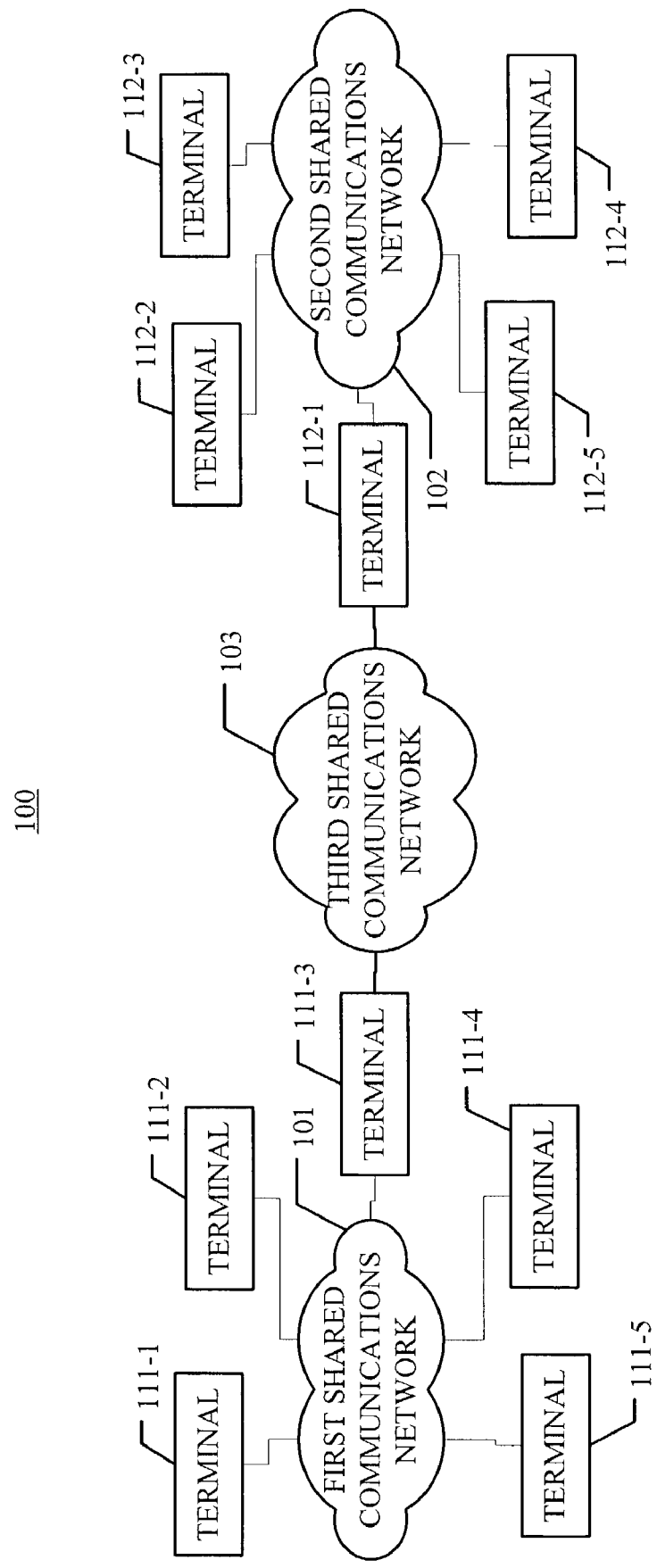
FIG. 1 depicts a schematic diagram of the prior art.
Figure 2:
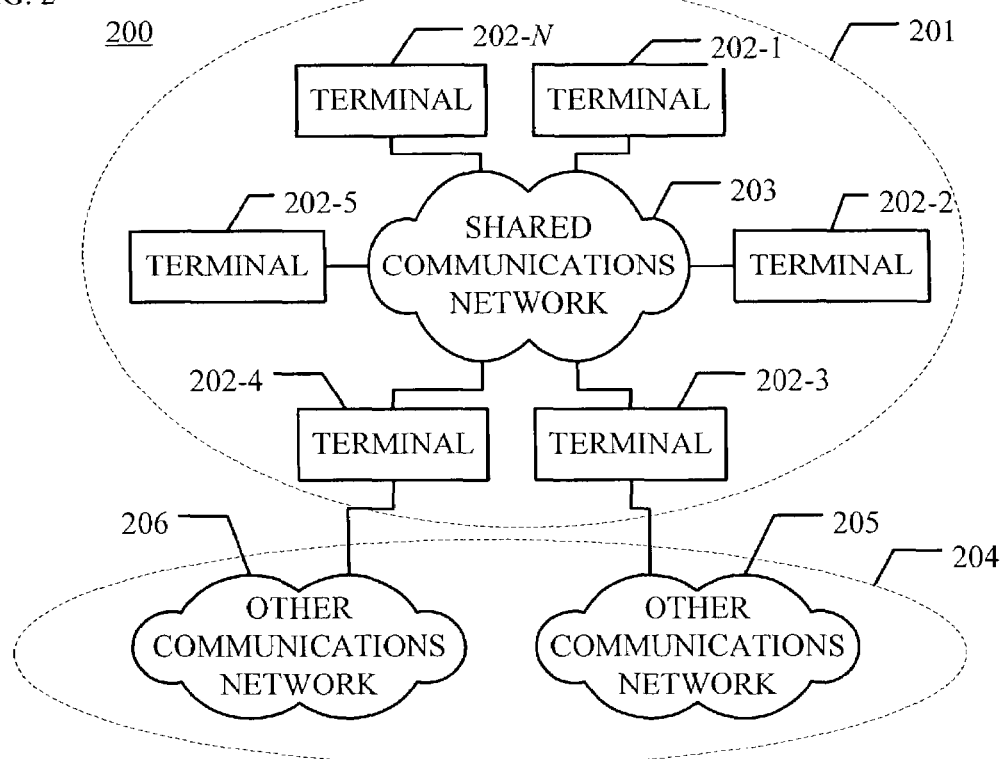
FIG. 2 depicts a schematic diagram of the illustrative embodiment of the present invention.

FIG. 2 depicts a schematic diagram of the illustrative embodiment of the present invention, telecommunications system 200, which transmits signals between terminals 202-1 through 202-N, wherein N is a positive integer, over shared communications network 203.

In accordance with the illustrative embodiment, telecommunications system 200 is a packet-switched network, in contrast to a circuit-switched network, as is well known to those skilled in the art. In other words, a macro data structure (e.g., a text file, a portion of a voice conversation, etc.) of indefinite size is not necessarily transmitted across shared communications network 203 intact, but rather might be transmitted in small pieces, each piece referred to as a "data unit."

One or more of these small pieces is encapsulated into a data structure called a "data frame," and each data frame traverses shared communications network 203 independently of the other data frames. The intended receiver of the macro data structure collects all of the data frames as they are received, recovers the small pieces of data from each, and reassembles them into the macro data structure.

Shared communications network 203 can be a wireless or wireline or hybrid wireless and wireline network. One example of such a network is a wireless local area network (WLAN), such as an 802.11 WLAN. The 802.11 WLAN typically operates at 2.4 gigahertz in the Industrial, Scientific, Medical band in the radio frequency spectrum and comprises the 802.11a and 802.11b standards. A salient characteristic of shared communications network 203 is that every data frame transmitted on shared communications network 203 by any terminal is received or "seen" by every terminal on shared communications network 203, regardless of where the data frame was addressed for it or not. In other words, shared communications network 203 is effectively a broadcast medium.

Telecommunications system 200 comprises ultimately source nodes that are sending data to ultimately destination nodes, in which data units are packaged into data frames and transmitted. The illustrative embodiment of the present invention, however, classifies telecommunications system 200 into different regions. The regions are then differentiated from each other by assigning each region a different address space. In FIG. 2, telecommunications system 200 is divided into two regions. First address space 201 represents the first region, comprising shared communications network 203, while second address space 204 represents the second region, comprising other communications network 205 and 206.

Other communications network 205 and 206 each can be a shared communications network, can physically be part of shared communications network 203, or can be a unique network, as long as data unit and data frame concepts are applicable.

For a given data unit that is being transferred through telecommunications system 200, relevant addresses that might be prominent on certain links between nodes in the prior art are buried within a payload of each data frame in the illustrative embodiment. The addressing used is described in detail later.

Because each terminal receives both data frames addressed for it and data frames not addressed for it, the illustrative embodiment incorporates a mechanism that enables each terminal to distinguish between the two. This mechanism is described in detail below. It will be clear to those skilled in the art how to make and use shared communications network 203. It will also be clear to those skilled in the art that shared communications network 203 in FIG. 2 is illustrative only and that other types of communications networks are within the scope of the present invention.

Terminals 202-1 through 202-N receive or generate the macro data structure and prepare it for transmission over shared communications network 203. The macro data structure can represent, for example, telemetry, text, audio, video, etc. Alternatively, one or more of terminals 202-1 through 202-N (e.g., terminal 202-3, terminal 202-4, etc.) can function as gateways between shared communications network 203 and other communications networks 205 and 206. In functioning as a gateway, a terminal receives the macro data structure from another communications network.

Terminals 202-1 through 202-N, as well as other terminals present in other communications network 205 and 206, implement source nodes, transmitter nodes, receiver nodes, and destination nodes. The various nodes are defined as follows:

1. Source node—The node at which a data unit originates in a second address space.
2. Transmitter node—The node used to transmit a data frame comprising the data unit across a first address space. The transmitter node and source node can be the same.
3. Receiver node—The node used to receive the data frame within the first address space.
4. Destination node—The node that is the recipient of the data unit in the second address space. The receiver node and destination node can be the same.

For example, for a given macro data structure, a terminal in other communications network 206 acts as the source node, terminal 202-4 acts as the transmitter node, terminal 202-3 acts as the receiver node, and a terminal in other communications network 205 acts as the destination node. Furthermore, as another example, terminal 202-4 acts as the source node for a first macro data structure, acts as the transmitter node for a second macro data structure, acts as the receiver node for a third macro data structure, and acts as the destination node for a fourth macro data structure.

Figure 3:
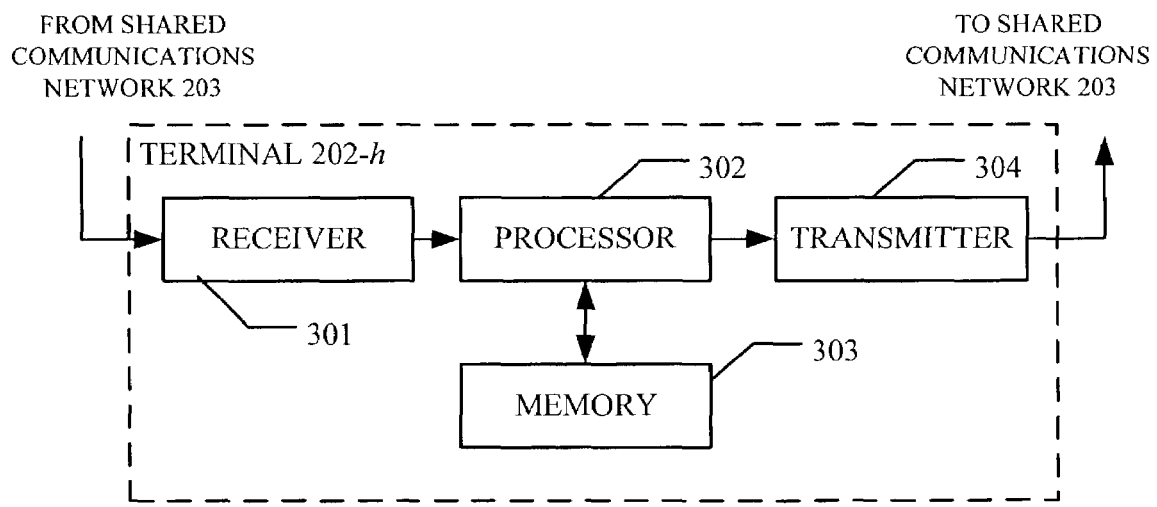
FIG. 3 depicts a block diagram of the salient components of terminal 202-h, for h=1 through N, in accordance with the illustrative embodiment of the present invention.

FIG. 3 depicts a block diagram of the salient components of terminal 202-$h$, for h=1 through N, in accordance with the illustrative embodiment of the present invention. Receiver 301 comprises the wireless, wireline, or hybrid wireless and wireline interface circuitry that enables terminal 202-$h$ to receive data frames from shared communications network 203. When receiver 301 receives a data frame from shared communications network 203, it passes the data frame to processor 302 for processing. It will be clear to those skilled in the art how to make and use receiver 301.

Processor 302 is a general-purpose or special-purpose processor that is capable of performing the functionality described below and with respect to FIG. 4 through 9. In particular, processor 302 is capable of storing data into memory 303, retrieving data from memory 303, and of executing programs stored in memory 303. It will be clear to those skilled in the art how to make and use processor 302 and memory 303.

Transmitter 304 comprises the wireless, wireline, or hybrid wireless and wireline interface circuitry that enables terminal 202-$h$ to transmit data frames onto shared communications network 203. It will be clear to those skilled in the art how to make and use transmitter 304.

Figure 4:
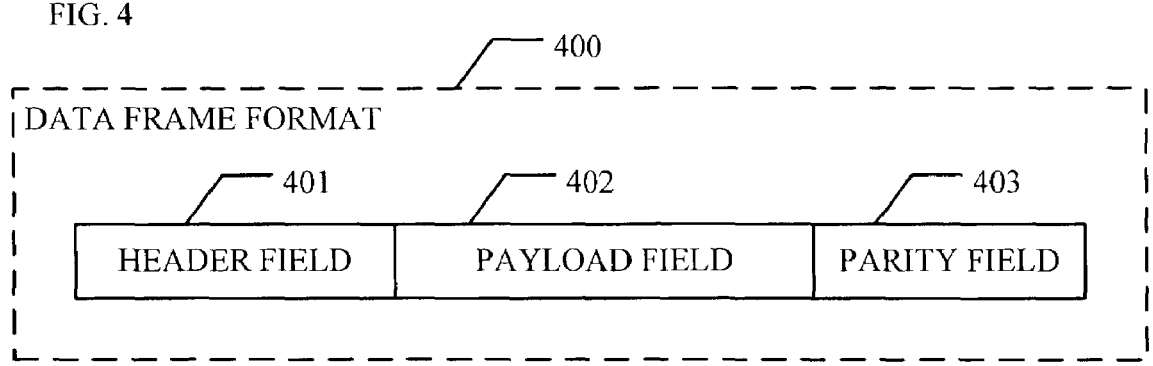
FIG. 4 depicts an illustration of the format of data frame 400 in accordance with the illustrative embodiment of the present invention.

FIG. 4 depicts an illustration of data frame 400 in accordance with the illustrative embodiment of the present invention. The data frame format is of variable length, up to some maximum number of bits, and comprises three salient fields: header field 401, payload field 402, and parity field 403. It will be clear to those skilled in the art how to delimit and demarcate these fields within a single data frame. Furthermore, it will be clear to those skilled in the art that the order of the fields depicted in FIGS. 4 thorough 7 is illustrative only and that other orders of the fields are within the scope of the present invention.

Figure 5:
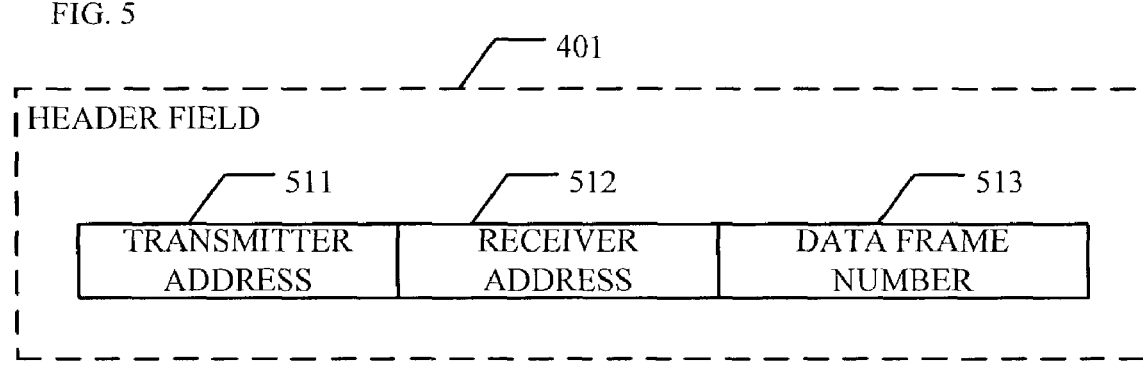
FIG. 5 depicts an illustration of the format of header field 401 in accordance with the illustrative embodiment of the present invention.

Header field 401 depicted in FIG. 5 comprises subfields that signify:

1. Transmitter address 511 or other identifying indicium of the transmitter node terminal from which the data frame is transmitted within first address space 201,
2. Receiver address 512 or other identifying indicium of the receiver node terminal to which the data frame is intended within first address space 201, and
3. Data frame number 513 or other sequential indicium of the particular data frame with respect to the other data frames associated with the same data transaction between the transmitter node and receiver node within first address space 201.

Transmitter address 511 and receiver address 512 are used for address filtering and for sending acknowledgements within first address space 201. Other addresses (i.e., addresses pertaining to second address space 204) are not required in header field 401 because data frame 400 is always transmitted between two nodes on shared communications network 203.

It will be clear to those skilled in the art how to make and use header field 401. It will also be clear to those skilled in the art that header field 401 can comprise other subfields.

In accordance with the data frame format, payload field 402 carries the payload, which represents all or a portion of one or more macro data structures. Payload field 402 is shown in more detail in FIG. 6 and is described later.

Parity field 403 comprises at least one parity bit from an error-control coding scheme that can detect, but not correct, at least i bit errors in the data frame (i.e., header field 401, payload field 402, and parity field 403), wherein i is a positive integer. As is well-known to those skilled in the art, the bits in parity field 403 represent redundancy that enable the detection of one or more corrupt bits in the data frame. It will be clear to those skilled in the art how to choose an appropriate error-control coding scheme to enable the detection of at least i bit errors in the data frame.

The illustrative embodiment of the present invention is used to combine multiple data units and transmit them inside a single data frame. A data unit typically comprises one or more octets of application information. An example of a data unit in a shared communications network context is the Medium Access Control Service Data Unit (MSDU) used in local area networks. Data units are concatenated when they travel between the same transmitter node and receiver node on shared communications network 203. The data units that travel inside a single data frame, however, can originate from different source nodes prior to passing through the transmitter node. The source node or nodes represented by the data frame can be the same as the transmitter node or they can be different than the transmitter node. Furthermore, the data units packaged with a data frame can ultimately travel to different destination nodes after they pass through the receiver node. The destination node or nodes handled by the data frame can be the same as the receiver node or they can be different than the receiver node. The one or more data units packaged within a single data frame are represented in the illustrative embodiment by payload field 402.

Figure 6:
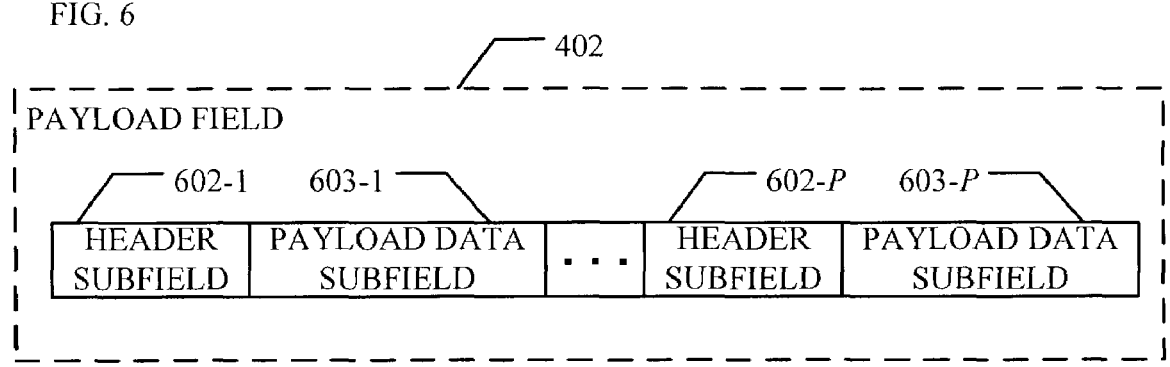
FIG. 6 depicts an illustration of the format of payload field 402 in accordance with the first variation of the illustrative embodiment of the present invention.

FIG. 6 depicts an illustration of the format of payload field 402. Payload field 402 comprises: header subfield 602-$j$ and payload data subfield 603-$j$, for j=1 to P. The value for P is equal to the number of source address/destination address groupings that are handled by data frame 400. A given combination of source and destination address can appear in more than one grouping. Header subfield 602-$j$ is described below. Payload data subfield 603-$j$ handles the one or more data units for the jth source/destination node grouping.

It will be clear to those skilled in the art how to delimit and demarcate header subfield 602-$j$ and payload data subfield 603-$j$ within payload field 402. For example, some or all of header subfield 602-$j$ can be intermingled with some or all of payload data subfield 603-$j$. Also, it will be clear to those skilled in the art that payload field 402 can comprise other subfields.

Figure 7:
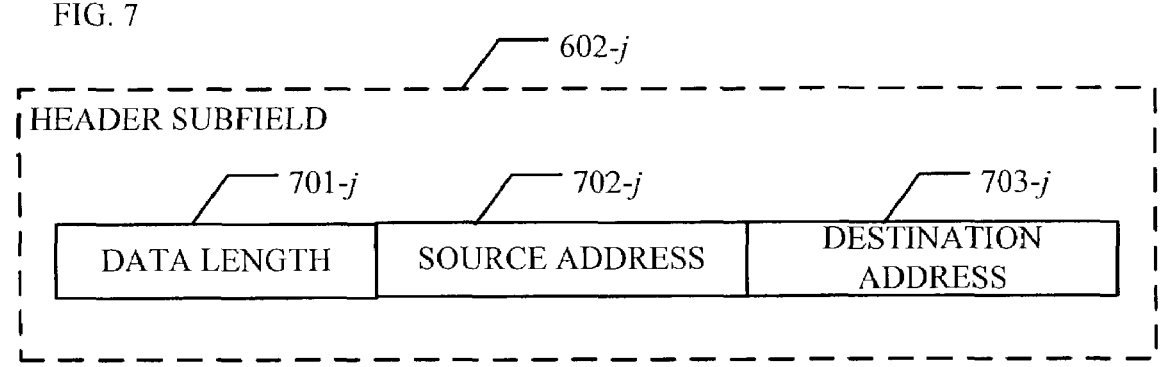
FIG. 7 depicts an illustration of the format of header subfield 602 in accordance with the illustrative embodiment of the present invention.

FIG. 7 depicts an illustration of the format of header subfield 602-$j$. Header subfield 602-$j$ comprises: data length field 701-$j$, source address field 702-$j$, and destination address field 703-$j$. Data length field 701-$j$ indicates how many data units constitute the jth group of one or more data units corresponding to a particular source address and destination address combination. Data length field 701-$j$, or an equivalent, can be used to determine which combinations of header subfields and payload data subfields belong to which macro data structure handled within payload field 402.

Source address field 702-$j$ is used to store the address field of the source node of the associated data unit or units for the jth group. Destination address field 703-$j$ is used to store the address field of the destination node of the associated data unit or units for the jth group. The addresses represented by source address field 702-$j$ and destination address field 703-$j$ are in second address space 204.

It will be clear to those skilled in the art how to delimit and demarcate data length field 701-$j$, source address 702-$j$, and destination address 703-$j$ within header subfield 602-$j$. Also, it will be clear to those skilled in the art that header subfield 602-$j$ can comprise other subfields.

Figure 8:
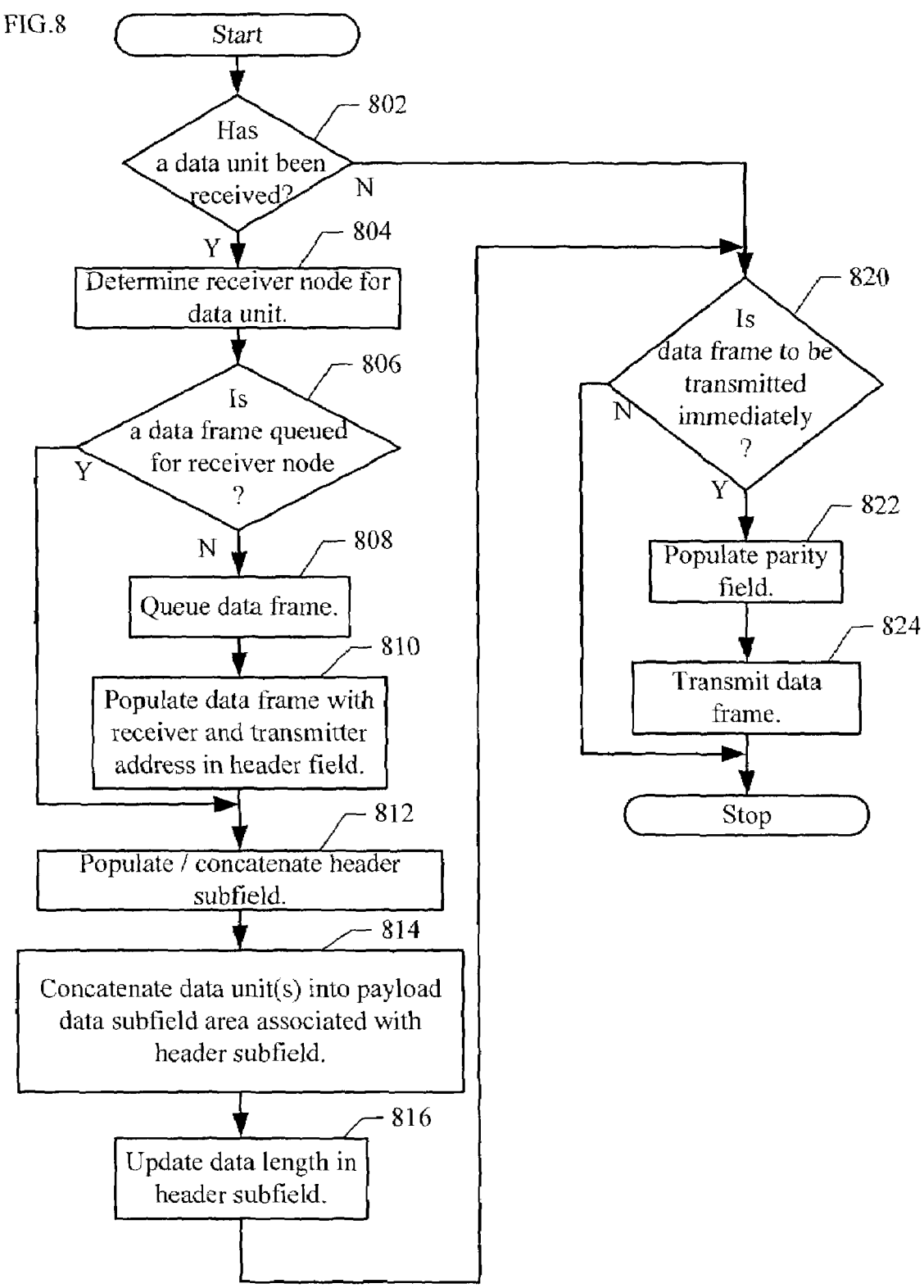
FIG. 8 depicts a flowchart of the tasks performed by a terminal in forming and transmitting data frame 400.

FIG. 8 depicts a flowchart of the tasks performed by a terminal acting as a transmitter node in forming and transmitting data frames on shared communications network 203. The tasks represented by the flowchart in FIG. 8 are invoked for data units to be sent to one or more receiver nodes, in which a data frame is queued for each receiver node. The source address and destination address can be different across each of the arriving data units within each data frame queued. Each data frame has the same, single transmitter address, since the same, single transmitter node represented by the transmitter address is performing the tasks shown. It will be clear to those skilled in the art which of the tasks depicted in FIG. 8 can be performed simultaneously or in a different order than that depicted in FIG. 8.

At task 802, the terminal determines if a new data unit has been received. If not, control proceeds to task 820. If so, control passes to task 804.

At task 804, the terminal determines the receiver node for each arriving data unit. It will be clear to those skilled in the art how to determine the receiver node.

At task 806, the terminal determines if a data frame suitable for each arriving data unit has already been queued for the intended receiver node. In other words, the terminal determines if a data frame exists in the queue that is to be transmitted to a receiver node with the same receiver address that is associated with the arriving data unit. If so, control passes to task 812. If not, control passes to task 808.

At task 808, the terminal queues and formats a new data frame containing the receiver address of the arrived data unit.

At task 810, the terminal populates the header field in the data frame with transmitter address 511 and receiver address 512. Transmitter address 511 represents the transmitter node in first address space 201 currently handling data frame 400. Receiver address 512 represents the receiver node in first address space 201 to which data frame 400 will be transmitted. It will be clear to those skilled in the art how to determine transmitter address 511 and receiver address 512.

At task 812, the terminal populates header subfield 602-*j* in payload field 402 with source address 702-*j* and destination address 703-*j*. The terminal also concatenates header subfield 602-*j* into data frame 400. Source address 702-*j* in second address space 204 represents the original node of the data unit received. Source address 702-*j* and transmitter address 511 might be the same, or, if the original node is different than the current transmitter node, source address 502 and transmitter address 311 might be different. Destination address 703-*j* in second address space 204 represents the end node to which the data unit will be sent. Destination address 703-*j* and receiver address 512 might be the same, or, if the end node is different than the current receiver node, destination address 703-*j* and receiver address 512 might be different. It will be clear to those skilled in the art how to determine source address 702-*j* and destination address 703-*j*.

At task 814, the terminal concatenates into payload data subfield 603-*j* within data frame 400 the data unit or units that correspond to populated header subfield 602-*j*.

At task 816, the terminal updates data length 701-*j* of header subfield 602 in payload field 402.

At task 820, the terminal determines if data frame 400 is to be transmitted immediately. This can be the case, for example, when data frame 400 is currently at the head of the queue and shared communications network 203 is free for transmission. If not, control exits the tasks represented by the flowchart depicted in FIG. 8. If so, control passes to task 822.

At task 822, the terminal populates parity field 403. It will be clear to those skilled in the art how to populate parity field 403. Furthermore, it will be clear to those skilled in the art that parity field 403 cannot be populated until both header field 401 and payload field 402 have been populated.

At task 824, the terminal transmits the fully populated data frame onto shared communications network 203.

It will be clear to those skilled in the art how to perform each of the tasks in the flowchart shown in FIG. 8.

As depicted by FIG. 8, payload field 402 is filled while the procedure to access shared communications network 203 is in progress. The implication is that the average number of data units per payload field 402 depends on the average access latency. The access latency, in turn, depends on the occupancy level of shared communications network 203. This means that the efficiency of concatenation increases when the load on shared communications network 203 increases when the technique in the illustrative embodiment of the present invention is used. This type of self-regulation is both desirable and realizable for distributed and centrally coordinated access mechanisms.

Figure 9:
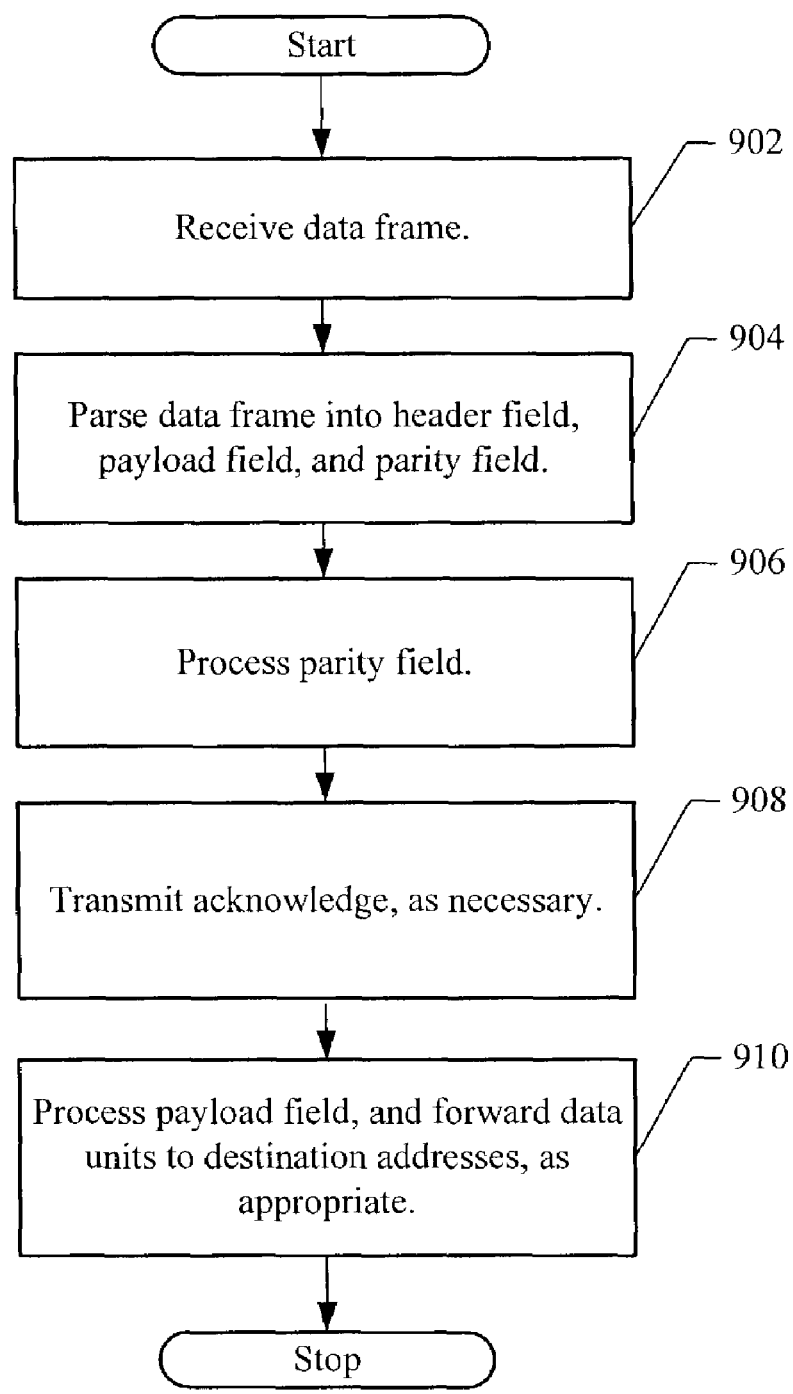
FIG. 9 depicts a flowchart of the tasks performed by a terminal in receiving and decoding data frame 400.

FIG. 9 depicts a flowchart of the tasks performed by a terminal in receiving and decoding data frame 400. It will be clear to those skilled in the art which of the tasks depicted in FIG. 9 can be performed simultaneously or in a different order than that depicted in FIG. 9.

At task 902, the terminal implementing the receiver node receives data frame 400 from shared communications network 203.

At task 904, the terminal parses data frame 400 into its constituent header field 401, payload field 402, and parity field 403.

At task 906, the terminal processes the parity bits in parity field 403 with the error-control coding scheme to test the integrity of the bits in data frame 400 to determine if there are any bit errors in data frame 400.

At task 908, the receiver node terminal transmits an acknowledgement to the terminal implementing the transmitter node, in well-known fashion, if data frame 400 is addressed for the receiver node terminal and if the parity bits in the parity field suggest that data frame 400 has been received without bit errors. Alternatively, the terminal can transmit an acknowledgement that indicates the disposition of the data frame, even if bit errors are present.

At task 910, the receiver node terminal processes data frame 400, in well-known fashion, if data frame 400 is addressed for the receiver node terminal and the parity bits in parity field 403 suggest that data frame 400 has been received without any bit errors. If the receiver node terminal is different from the destination node or nodes for which the data units are intended, the receiver terminal forwards the data units within data frame 400 to the destination addresses indicated in header subfield 602.

It will be clear to those skilled in the art how to perform the tasks in the flowchart shown in FIG. 9.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
    concatenating data units at a medium access control (MAC) layer in a transmitter node in a wireless local area network, the concatenating comprising:
        forming a data frame addressed for a receiver node, wherein said data frame comprises a header field and a payload field, and wherein said payload field comprises a first header subfield and a first payload data subfield;
        populating said first payload data subfield with at least one data unit;
        populating said header field with a receiver address uniquely associated with said receiver node and a transmitter address uniquely associated with said transmitter node; and
        populating said first header subfield with a first source MAC address and a first destination MAC address that are associated with said first payload data subfield; and
    transmitting the data frame.

2. The method of claim 1, wherein said payload field further comprises a second header subfield and a second payload data subfield, said method further comprising:
    populating said second payload data subfield with at least one data unit;
    populating said second header subfield with a second source MAC address and a second destination MAC address that are associated with said second payload data subfield.

3. The method of claim 2, wherein said first destination MAC address and said second destination MAC address are different.

4. The method of claim 2, wherein said first source MAC address and said second source MAC address are different.

5. The method of claim 1, wherein said first source MAC address and said transmitter address are different.

6. The method of claim 1, wherein said first destination MAC address and said receiver address are different.

7. The method of claim 1, further comprising adding additional data units to said first payload data subfield during an interval in which said data frame is queued for transmission wherein said additional data units are concatenated to said at least one data unit.

8. The method of claim 1, wherein said data frame further comprises a parity field.

9. The method of claim 1, wherein said wireless local area network conforms to the 802.11 standard.

10. The method of claim 1, wherein said wireless local area network is operative in the 2.4 gigahertz Industrial, Scientific, Medical band of a radio frequency spectrum.

11. An apparatus comprising:
a transmitter node for transmitting data frames in a shared communication network, said transmitter node comprising:
  a processor for:
    forming a data frame addressed for a receiver node, wherein said data frame comprises a header field and a payload field, and wherein said payload field comprises a first header subfield and a first payload data subfield;
    populating said first payload data subfield with at least one data unit;
    populating said header field with a receiver address uniquely associated with said receiver node and a transmitter address uniquely associated with said transmitter node;
    populating said first header subfield with a first source medium access control (MAC) address and a first destination MAC address that are associated with said first payload data subfield; and
    concatenating additional data units to the at least one data unit in the first payload data subfield;
  a transmitter for transmitting said data frame onto the shared communication network.

12. The apparatus of claim 11, wherein said payload field further comprises a second header subfield and a second payload data subfield, said second payload data subfield populated with at least one data unit and said second header subfield populated with a second source MAC address and a second destination MAC address that are associated with said second payload data subfield.

13. The apparatus of claim 11, wherein said first source address MAC and said transmitter address are different.

14. The apparatus of claim 11, wherein said first destination MAC address and said receiver address are different.

15. The apparatus of claim 11, further comprising adding additional data units to said first payload data subfield during an interval in which said data frame is queued for transmission wherein said additional data units are concatenated to said at least one data unit.

16. The apparatus of claim 11, wherein said shared communication network conforms to the 802.11 standard.

17. A method comprising:
receiving at a transmitter node in a wireless local area network a first data unit from a first source node with a first medium access control (MAC) address wherein said first data unit is addressed for a first destination node with a second MAC address served by a receiver node;
placing in a queue a data frame comprising said first data unit;
concatenating to said data frame a second data unit received from a second source node with a third MAC address wherein said second data unit is addressed for a second destination node with a fourth MAC address served by said receiver node; and
transmitting said data frame when said data frame reaches the head of said queue
wherein said first source node and said second source node are different from said transmitter node.

18. The method of claim 17, wherein said first source node and said second source node are different.

19. The method of claim 17, wherein said first destination node and said second destination node are different.

20. The method of claim 17, wherein said wireless local area network conforms to the 802.11 standard.

21. The method of claim 17, wherein said wireless local area network is operative in the 2.4 gigahertz band of a radio frequency spectrum.

* * * * *